Reissued Oct. 15, 1935

Re. 19,725

UNITED STATES PATENT OFFICE 19,725

CARBON-FREE METAL

Paul Dyer Merica, New York, N. Y., and Augustus Ernest Kayes, Huntington, W. Va., assignors, by mesne assignments, to The International Nickel Company, Inc., New York, N. Y., a corporation of Delaware No Drawing. Original No. 1,811,696, dated June 23, 1931, Serial No. 192,782, May 19, 1927. Application for reissue December 31, 1931, Serial No. 584,274

3 Claims. (Cl. 75—66)

This invention relates to carbon-free metals and a method of producing the same, and is particularly adapted for the production of nickel and nickel alloys.

Heretofore, it has been the practice in making nickel and nickel alloys, such as "Monel" metal, to melt the metal and either oxidize or carburize to adjust the carbon content of the metal bath to between 0.05% and 0.3%, deoxidize by the addition of manganese and sometimes silicon either in the furnace or in the ladle, and finish with a magnesium treatment consisting of adding approximately 1½ ounces of magnesium per 100 pounds of metal. The metal was then cast into ingots or sand castings.

Metal produced according to this treatment contained as impurities, small amounts of carbon, silicon and manganese as well as iron and copper, which are not introduced during the refining proper. These impurities, and particularly the carbon, affect the hardness and workability of the metal to some extent. Difficulty is encountered also occasionally on account of gas inclusions in the ingots, leading to seams or blisters in the roller metal. These gas inclusions may be of two types, either an oxidized gas, such as carbon monoxide, or a reduced gas, such as hydrogen or a hydrocarbon.

It has been very difficult to consistently remove both types of included gas from the molten metal, due probably to the fact that in current practice, carbon is the principal reducing agent and its reducing action depends upon the formation of carbon monoxide which may remain in the metal and gives unsoundness.

We provide for the production of sound malleable metal by the substantially complete elimination of carbon. Reducing agents other than carbon are employed and the metal is brought to a highly oxidized state just prior to deoxidation so that no appreciable quantities of reduced gases, such as hydrocarbons or hydrogen, can be present.

We will describe our invention with particular reference to the production of nickel and "Monel" metal, although it will be understood that the invention is not limited to nickel-containing metals.

According to our method, the nickel-containing metal is melted and by flapping, (addition of nickel oxide), or other desirable method, the carbon is oxidized completely and the carbon monoxide is boiled out of the metal. The nickel oxide which is present in the melt at this stage is then reduced by the addition of a deoxidizer which does not form gaseous oxides, such as silicon in some commercial form. Manganese is added if necessary or desired; and the usual magnesium treatment may follow; after which the metal is cast into ingots or sand castings. This process of oxidation followed by nongaseous reduction may be carried out in any of the usual types of furnace—open hearth, acid or basic, converter or electric furnace.

Inasmuch as the carbon is completely removed and its oxidation products are driven from the metal, there is no possibility of carbon monoxide gas inclusions. Inasmuch as the bath was in a highly oxidized state just prior to the deoxidizing stage, no appreciable quantities of reduced gases, such as hydrogen or hydrocarbons, can be present in the metal. A deoxidizer is then used which does not introduce either oxidized or reduced gases into the metal. For example silicon aluminum, calcium, manganese or magnesium, may be used. Consequently, the resultant metal and ingot are free from gas inclusions.

As the deoxidizer or part of it should pass into the slag, we prefer to add it or them in the furnace or partly in the furnace and partly in the ladle. For example, silicon may be added to the metal in the furnace from ten to fifteen minutes before tapping, so that in this period it will complete its reaction with the oxides in the bath, the silica formed rising and entering the slag. During this time, a small amount of silicon will also oxidize in the bath. In the same way, part of the silicon may be added in the furnace, as just described, and the remainder added in the ladle. If silicon is used, satisfactory results may be obtained by adding silicon within a range, for example, from 0.10% to 0.50%. In such case, there may remain in the metal anywhere from 0.03% up to 0.30% or more of residual silicon, and when the operation is properly carried out, this amount will render the product readily malleable.

We have found this method to produce very sound and malleable nickel and "Monel" metal entirely free from carbon and manganese, when deoxidized with silicon, leaving about 0.03%–0.30% of residual silicon, preferably followed by the usual magnesium addition. Manganese need not be added where the metal is carbon-free; and this is of advantage in some products, for example, where high purity is desired, as in nickel anodes for plating. The process may be applied to all copper-nickel alloys which dissolve small amounts of carbon, together with copper-nickel base alloys containing other and substantial alloying additions, such as iron, manganese, aluminum, silicon, etc. The process is in fact applicable to any metal or alloy which normally carries a small amount of carbon when melted in contact with carbonaceous refractories or an atmosphere containing carbon, and is, of course, readily carried out on any such alloy as long as there is no other element in the alloy which oxidizes more readily than carbon. In case there is present an element more readily oxidizable than carbon, it must be burned out and oxidized, together with the carbon, and subsequently added, if desired. The process is thus adapted for the production of other metals which take up carbon, such as steel and some of the bronzes.

The product obtained by our process is sound, tough and malleable, gas-free and carbon-free.

Whether in the form of castings or forgings or rolled or wrought metal, it is well adapted for nickel-plating anodes, for the production of solid nickel shot, and for general purposes in all cast and wrought forms where malleability, both hot and cold, and soundness are required. We are aware that it has been proposed to produce nickel anodes for electrolysis by partial deoxidation by means of a metallic deoxidizer, such as aluminum. The product, however, has not been gas-free, nor has it been tough and malleable.

The advantages of a carbon-free metal for welding are apparent, particularly for metal electrodes for arc welding, because the possibility of gas formation in the welded material is precluded by the absence of carbon.

We have found that the carbon-free product is softer than the carbon-bearing product and is therefore more adaptable for cold rolling and cold fabrication.

The process is well adapted for the refining of scrap metal since the metal is completely oxidized to the point where all gases and most metalloid impurities have been eliminated followed by deoxidation. Thus, from scrap material of doubtful quality, we can produce a fine, soft, malleable product.

The process is also adaptable for the production of carbon-bearing metals, since after the process proper, a gas-free carburizing agent may be added just before tapping. In this way, a harder and stronger material may be obtained.

While we have described the preferred embodiment of our process, it will be understood that the invention is not so limited, but may be otherwise embodied within the scope of the following claims.

We claim:—

1. The process of producing nickel-containing castings, which comprises melting the metal, subjecting it to a treatment which completely oxidizes any carbon present, boiling out the resultant gaseous oxides, and thereafter adding silicon and magnesium and substantially completely deoxidizing the nickel.

2. The process of producing nickel-containing castings, which comprises melting the metal, subjecting it to an oxidizing treatment other than Bessemerizing, removing the resulting gaseous oxides, and thereafter completely deoxidizing the nickel by means of a deoxidizing agent which does not form gaseous oxides.

3. The process of producing sound, tough, malleable, gas-free and carbon-free nickel products which comprises melting nickel-containing metal to form a molten bath, oxidizing carbon-containing components of the bath to gaseous oxides, boiling out the gaseous oxides, and reducing said molten bath by adding a non-carbon-bearing deoxidizer selected from the group consisting of silicon, aluminum, calcium, manganese and magnesium to such an amount that the metal is completely deoxidized and a small percentage of deoxidizer remains in the treated metal.

PAUL DYER MERICA.
AUGUSTUS ERNEST KAYES.